United States Patent
Monk (10) Patent No.: US 12,374,199 B2
(45) Date of Patent: Jul. 29, 2025

(54) HAPTIC WEARABLES FOR USERS HAVING HEARING LOSS

(71) Applicant: Keelin Grace Monk, Houston, TX (US)

(72) Inventor: Keelin Grace Monk, Houston, TX (US)

( * ) Notice: Subject to any disclaimer, the term of this patent is extended or adjusted under 35 U.S.C. 154(b) by 130 days.

(21) Appl. No.: 18/532,493

(22) Filed: Dec. 7, 2023

(65) Prior Publication Data
US 2024/0194039 A1 Jun. 13, 2024

Related U.S. Application Data

(60) Provisional application No. 63/386,405, filed on Dec. 7, 2022.

(51) Int. Cl.
  *G08B 1/08* (2006.01)
  *G08B 6/00* (2006.01)
  *H04B 5/20* (2024.01)

(52) U.S. Cl.
  CPC ............ *G08B 6/00* (2013.01); *H04B 5/20* (2024.01)

(58) Field of Classification Search
  CPC .................. G08B 6/00; H04B 5/20
  USPC ....................................... 340/539.11
  See application file for complete search history.

(56) References Cited

U.S. PATENT DOCUMENTS

| | | | |
|---|---|---|---|
| 9,626,845 B2 | 4/2017 | Eagleman et al. | |
| 10,111,013 B2 | 10/2018 | Hu | |
| 10,264,339 B2 * | 4/2019 | Schwartz | H04R 1/028 |
| 10,699,538 B2 | 6/2020 | Novich et al. | |
| 2011/0270135 A1 * | 11/2011 | Dooley | G16H 50/30 600/595 |
| 2016/0012688 A1 * | 1/2016 | Eagleman | G09B 21/003 340/407.1 |
| 2020/0236475 A1 * | 7/2020 | Fritsch | H04R 25/505 |
| 2023/0113744 A1 | 4/2023 | Eagleman et al. | |
| 2024/0077946 A1 * | 3/2024 | Agarwal | G06F 3/017 |

FOREIGN PATENT DOCUMENTS

| | | | |
|---|---|---|---|
| DE | 102014110476 A1 * | 4/2015 | A61B 5/7455 |
| KR | 200475529 Y | 12/2014 | |

OTHER PUBLICATIONS

Printout from webpage entitled "Brains of deaf people rewire to 'hear' music,", by Walter Neary, 4 pages, posted on Nov. 27, 2021. Retrieved from Internet:.
Printout from webpage entitled "Bringing the Joy of Music to the Hard of Hearing,", by Jake Uitti, 8 pages, posted on Sep. 20, 2021. Retrieved from Internet:.
Printout from webpage entitled "Deaf Jam: Experiencing Music Through a Cochlear Implant,", by John Hamilton, 19 pages, posted on May 18, 2015. Retrieved from Internet:.

(Continued)

*Primary Examiner* — Tai T Nguyen
(74) *Attorney, Agent, or Firm* — Alberto Q. Amatong, Jr.; Amatong McCoy LLC (57) ABSTRACT

A wearable haptic system is disclosed herein. The wearable haptic system includes two wearable wrist bands and two wearable anklets. Each of the wrist bands includes eight haptic motors, and each of the anklets includes eight haptic motors. The haptic motors are configured to receive Bluetooth signals and are to be actuated to move upon receipt of Bluetooth signals.

18 Claims, 7 Drawing Sheets

(56) References Cited

OTHER PUBLICATIONS

Printout from webpage entitled "Feel the Music, CuteCircuit SoundShirt," 9 pages, posted on Nov. 19, 2020. Retrieved from Internet:.
Printout from webpage entitled "How Sound Waves Work," 2 pages, retrieved on Mar. 5, 2024. Retrieved from Internet:.
Printout from webpage entitled "How the Deaf Experience Music—Then and Now", 4 pages, posted on Nov. 8, 2018. Retrieved from Internet:.
Printout from webpage entitled "Magnetic fields can control heat and sound,", by Joseph Heremans, 3 pages, published on Mar. 23, 2025. Retrieved from Internet:.
Printout from webpage entitled "Music: Not Impossible, "8 pages, retrieved on Mar. 5, 2024. Retrieved from Internet:.
Printout from webpage entitled "SOUNDSHIRT, Experience the feeling of being fully immersed in Music," 3 pages, retrieved on Mar. 5, 2024. Retrieved from Internet:.
Printout from webpage entitled "The genetics of deafness", by Watler E. Nance, 2 pages, published in 2003. Retrieved from Internet:.
Printout from webpage entitled "This vest allows deaf people to 'hear' through touch," 11 pages, posted on Nov. 1, 2016. Retrieved from Internet:.
Printout from webpage entitled "Wearable Vest Helps Deaf People Hear Music,", by Antartica Journal, 4 pages, posted on Jan. 22, 2024. Retrieved from Internet:.
Printout from webpage entitled "What is the maximum range of a Bluetooth connection?," 3 pages, posted on Sep. 22, 2020. Retrieved from Internet:.
Printout from webpage entitled "Zappos wants the deaf and hard-of-hearing to listen to music—here is the technology for it", by Daniel Bukszpan, 9 pages, published on Oct. 23, 2018. Retrieved from Internet:.
Printout from Wikipedia webpage entitled "Cochlear implant,", 21 pages, retrieved on Mar. 5, 2024. Retrieved from Internet:.
Screen capture from YouTube video clip entitled "Creating New Human Senses," 4 pages, uploaded on Jul. 6, 2018 by user David Eagleman|Talks at Google. Retrieved from Internet:.

\* cited by examiner

HAPTIC WEARABLES FOR USERS HAVING HEARING LOSS

CROSS-REFERENCE TO RELATED APPLICATIONS

This application claims the benefit of U.S. Provisional Patent Application No. 63/386,405 filed on Dec. 7, 2022 and entitled "Haptic Wearables for Users Having Hearing Loss," the entirety of which is incorporated herein by reference.

FIELD

The present disclosure relates to haptic wearables suitable for use by users having hearing loss, such as for experiencing music, as well as to methods of making and using the same.

BACKGROUND

Sound waves are variations of pressure in a medium, such as air, and are created through the vibration of an object causing the medium to vibrate. When sound waves are created, the sound waves are either erratic or smooth. Smooth sound waves cause a set frequency to be translated to the ear while erratic sound waves cause several different frequencies to be translated to the ear. In a sound wave, the molecules and energy are transmitted in the medium as phonons. Phonons only travel a certain distance, but can interact with adjacent molecules in the medium prior to entering the eardrum. Upon receipt of the sound, the eardrum vibrates in a pattern that corresponds with the pattern of the sound vibrations in the medium through which the sound passed. The vibration pattern is transmitted from the eardrums to the brain, and the brain processes the vibration pattern and recognizes and/or assigns meaning to the vibration pattern.

Unfortunately, the hearing loss community is unable to receive, transmit, and/or process these vibration patterns (or is at least less capable of doing so). The hearing loss community includes people that are deaf as well as those that are hard of hearing, which includes individuals ranging from those that have mild hearing loss (e.g., loss of the ability to hear soft sounds) to those that have profound hearing loss (e.g., loss of most, if not all, hearing). Hearing loss can have many different causes, including environmental or genetic causes. The frequency of deafness caused by genetics has begun to rise as many more deaf marriages have begun to occur due to the gradually improving deaf culture. A majority of congenital genetic cases are caused by a mutation in the gene connexin 26. In addition to this mutated gene, some deaf people have a deletion in the connexin 30 gene. The combination of these two genetic issues causes those who are heterozygous for the recessive connexin 26 trait to be deaf. Another cause of deafness includes a combination of environment and genetics, including exposure to aminoglycosides. Aminoglycosides can cause ototoxicity, a loss in hearing or balance, and is known to cause permanent damage to hearing abilities. However, regardless of the many genetic and other causes, the majority (e.g., 90%) of deaf children are born to hearing parents.

TABLE 1

Hearing Loss Types

| Type | Common Description | Example | Decibel Loss |
| --- | --- | --- | --- |
| Mild Hearing Loss | Hard of Hearing | Cannot hear the sound of a gentle rain. | 20-40 decibels |
| Moderate Hearing Loss | Hard of Hearing | Cannot hear the sound of a phone ringing. | 40-75 decibels |
| Severe Hearing Loss | Deaf | Cannot hear the sound of a motorcycle engine being started. | 75-90 decibels |
| Profound Hearing Loss | Deaf | Cannot hear the sound of loud thunder. | 90-120 decibels |

Mild hearing loss is a level of hearing loss that is typically considered "hard of hearing" (as opposed to "deaf"). Mild hearing loss is characterized by a loss of about 20 to about 40 decibels. An example of a person with mild hearing loss is someone who cannot hear the sound of a gentle rain. Moderate hearing loss is a level of hearing loss that is also typically considered "hard of hearing." Moderate hearing loss is characterized by a loss of about 40 to about 75 decibels. An example of a person with moderate hearing loss is someone who cannot hear the sound of a phone ringing. Severe hearing loss is a level of hearing loss that is typically considered "deaf" (as opposed to "hard of hearing"). Severe hearing loss is characterized by a loss of about 75 to about 90 decibels. An example of a person with severe hearing loss is someone who cannot hear the sound of a motorcycle engine being started. Profound hearing loss is a level of hearing loss that is typically considered "deaf" Profound hearing loss is the most severe type of hearing loss. Profound hearing loss is characterized by a loss of about 90 to about 120 decibels. An example of a person with profound hearing loss is someone who cannot hear the sound of loud thunder.

Music is a valued art that provides many people with a sense of joy, serenity, and emotion. However, those of the deaf community are unable to experience music and the harmonies thereof in the same manner as those with hearing. Instead, the deaf experience music by sensing vibrations caused by the music. Studies have been conducted that included scanning the brains of deaf people while they were being subjected to vibrations. In these studies, deaf people were found to sense the vibrations in the auditory cortex of the brain that is typically only active during auditory stimulation.

Such studies indicate that the brains of the deaf may compensate for a lack of hearing by experiencing the sound through vibrations on the skin. Thus, the deaf and hard of hearing experience music through feeling the vibrations of the sound waves created from the music. The ability of the hard of hearing to perceive vibrations in the auditory cortex enhances the their ability to experience music. The auditory cortex is typically used by the hearing-able to interpret and understand sounds; however, for the deaf the function of the auditory cortex adapts to interpret and understand other vibrations. Even with this advanced vibration perception of the deaf, the ability to feel the vibrations may be limited due to the environment (e.g., large, open spaces where vibrations must travel over a larger area).

Some manners in which the deaf enhance the experience of sound through vibrations include holding an object that receives and amplifies the vibrations (e.g., a balloon or cup of water), taking off one's shoes to feel the musing through the floor, and standing close to source of the sound (e.g., a speaker). However, in relatively large spaces, vibrations become scattered and are more difficult to sense using such rudimentary methods.

In today's market, there is a severe lack of products enhancing musical experience for those of the hearing loss community, specifically regarding the experience of headphones. Currently available headphone like options for those of the hearing loss community target individuals with mild to moderate hearing loss or individuals who currently use and benefit from hearing aids. There are no current headphone-like products which apply and are usable to all members of the hearing loss community. There are many products which have enhanced the sound experience for those of the hearing loss community through the utilization of sensory substitution, in specific audio substitution through physical sensory stimulation; however, no existing product provides those of the hearing loss community with an experience that simulates listening to music through headphones. Some existing products to help the deaf experience music include: wearables that require vests or shirts or torso harness; products that use sound-to-light technology where the light represents different sounds; and implants that require invasive surgery. These existing products tend to be too bulky, inconvenient, heavy, and costly. Table 2, below, shows some existing products and their characteristics.

TABLE 2

Existing Product Characteristics

| | Accessibility | Rapid Translation | Size | Surround Body Experience | Quality Vibrations |
|---|---|---|---|---|---|
| Music: Not Impossible | No | Yes | No | Yes | Yes |
| Cochlear Implant | No | No | Yes | No | No |
| CuteCircuit | Yes | Yes | No | Yes | No |
| The VEST | Yes | Yes | No | No | Yes |
| DUSIC Cube | No | Yes | No | No | No |

Table 2 shows a comparison of the accessibility, rapid translation, size, surround body experience, and quality vibrations for five products, with "Yes" indicating the presence of a feature and "No" indicated the absence of a feature. The five products include Music: Not Impossible, cochlear implant, CuteCircuit, The VEST, and DUSIC Cube. Music: Not Impossible utilizes microphones, haptics known as exciters, and a 900 MHz frequency band. Music: Not Impossible is a bulky and heavy product having two wristbands, two anklets, and a vest. Therefore, while Music: Not Impossible provides rapid translation, surround body experience, and quality vibrations, it not accessible or of a desirable size. Cochlear implants are implants that are invasive and require surgery. Cochlear implants are relatively expensive and focus on advancing and understanding speech. While music can be "listened" to using cochlear implants, it is deficient in relating pitch and timbre. While cochlear implants have an acceptable size, they lack accessibility, rapid translation, surround body experience, and quality vibrations. Cochlear implants typically only work when implanted at a young age. Thus, older individuals of the hearing loss community may not be able to benefit from the advantages of Cochlear implants. The implants have even been reported to be ineffective for various individuals. CuteCircuit is a shirt that is worn underneath regular clothes. CuteCircuit uses thirty haptic motors and a microphone. CuteCircuit is accessible, and provides rapid translation and surround body experience; however, CuteCircuit lacks a desirable size 206 and quality vibrations. The VEST spreads vibrations across the torso with a vest that connects to a phone App that converts sound signals into vibrations transmitted the vest. The VEST uses Bluetooth and phone technology in association the vest. The VEST is accessible and provides rapid translation and quality vibrations, but lacks a desirable size and a surround body experience. DUSIC Cube uses sound-to-light technology, utilizing piezoelectricity and LEDs. DUSIC Cube generates lights of multiple different colors and brightness levels to represent different sounds and patterns. DUSIC Cube provides rapid translation, but lacks accessibility, a desirable size, surround body experience and quality vibrations. As evident from Table 2, each of these existing products fails to satisfy at least one of the charted characteristics. These existing products tend to be too bulky, inconvenient, heavy, and too costly.

BRIEF SUMMARY

Some embodiments of the present disclosure include a wearable haptic system. The wearable haptic system includes two wearable wrist bands and two wearable anklets. Each of the wrist bands includes eight haptic motors, and each of the anklets includes eight haptic motors. The haptic motors are configured to receive Bluetooth signals and are configured to actuate to move upon receipt of Bluetooth signals.

Also disclosed herein are methods of making and using the wearable haptic system.

BRIEF DESCRIPTION OF THE DRAWINGS

So that the manner in which the features and advantages of the systems, apparatus, and/or methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

DETAILED DESCRIPTION

Certain embodiments of the present disclosure include haptic wearables suitable for use by users having hearing loss (e.g., those that are deaf or hard of hearing). While described as being used by those with hearing loss, the haptic wearables disclosed herein are not limited to use by those with hearing loss. The haptic wearables disclosed herein can be used for experiencing sound, such as music, through vibrations in a manner other than hearing. Embodiments of the wearables disclosed herein are accessible, affordable, convenient, non-invasive, have a desirable size (e.g., small-sized and lightweight), provide rapid translation of music to vibration, and provide a surround body experience with crisp and quality vibrations. The wearables disclosed herein can be configured to allow the deaf experience music through amplification of vibrations; thereby, making music experiences more inclusive and equal amongst both the hearing and the hearing loss communities. The wearables disclosed herein introduce and promote a new type of musical inclusivity not yet existent.

Sensory Substitution

In some embodiments, the wearables disclosed herein exploit the theory of sensory substitution and the concept of umwelt to provide music experiences to the hard of hearing by expanding the umwelts of the deaf and hard of hearing to be able to hear through a different sense, such as touch. That is, one sense (e.g., touch) is redirected to fulfill another sense (e.g., hearing), also referred to as "sensory substitution." This is possible, at least in part, because the brain operates on electrochemical signals, regardless of the form of the original sensory input. Therefore, the eyes, ears, mouth, fingers, and nose are all different sensory inputs, but each result in the formation of electrochemical signals in the brain. The brain operates to recognize patterns in the electrochemical signals and assigns meaning to the patterns; thereby, generating one's perception of reality.

Wearable Bands

Figure 1A:
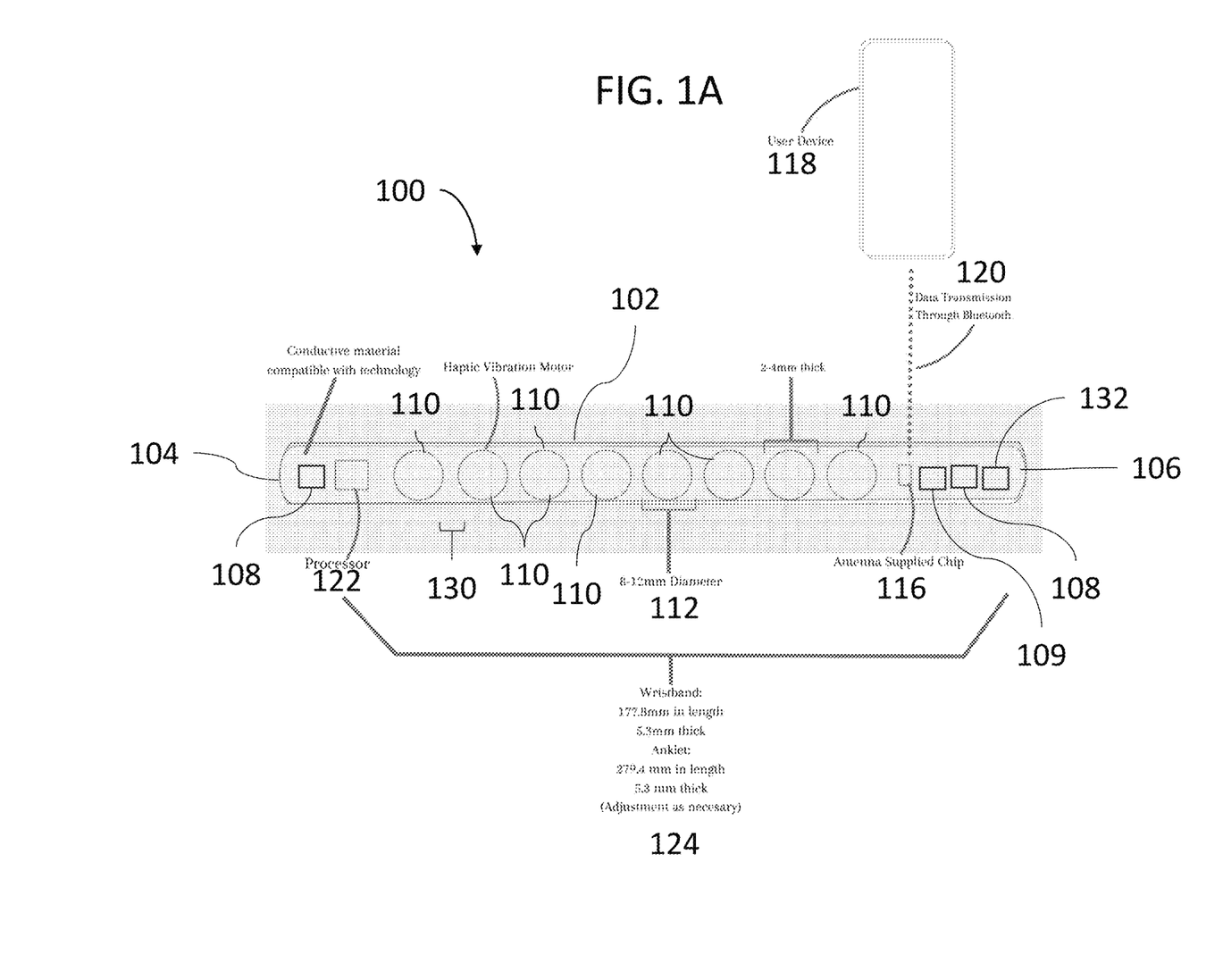
FIG. 1A depicts a wearable band in communication with a phone in accordance with embodiments of the present disclosure.

The wearables disclosed herein include a plurality of bands worn by a user that are configured to translate sound into vibrations to be felt by the user. With reference to FIG. 1A, an exemplary band, wearable band 100, is depicted. Wearable band 100 can be in the form of a wristband and/or anklet to be worn on a user's wrist or ankle. Wearable band 100 includes strap 102. Strap 102 is shown in an open or unlatched configuration in FIG. 1A. Strap 102 has a first end 104 and second end 106. The strap 102 can be wrapped about a user's wrist or ankle, and then the first end 104 can be secured to second end 106 via a fastener 108 to secure wearable band 100 on the user. The fastener 108 can be, for example, a latch, hook and loop fastener, magnets, slide lock clasp, or another fastener for securing the strap 102 in about a user's wrist or ankle. While the strap 102 is shown in an open configuration in FIG. 1A, in some embodiments, the strap of the wearable band is permanently in the form of a loop that is slid over a user's wrist and/or ankle when worn. For example, the strap can be made of a flexible and elastic material that can be stretched to slide over a user's hand or foot to be worn on the user's wrist or ankle.

Figure 1B:
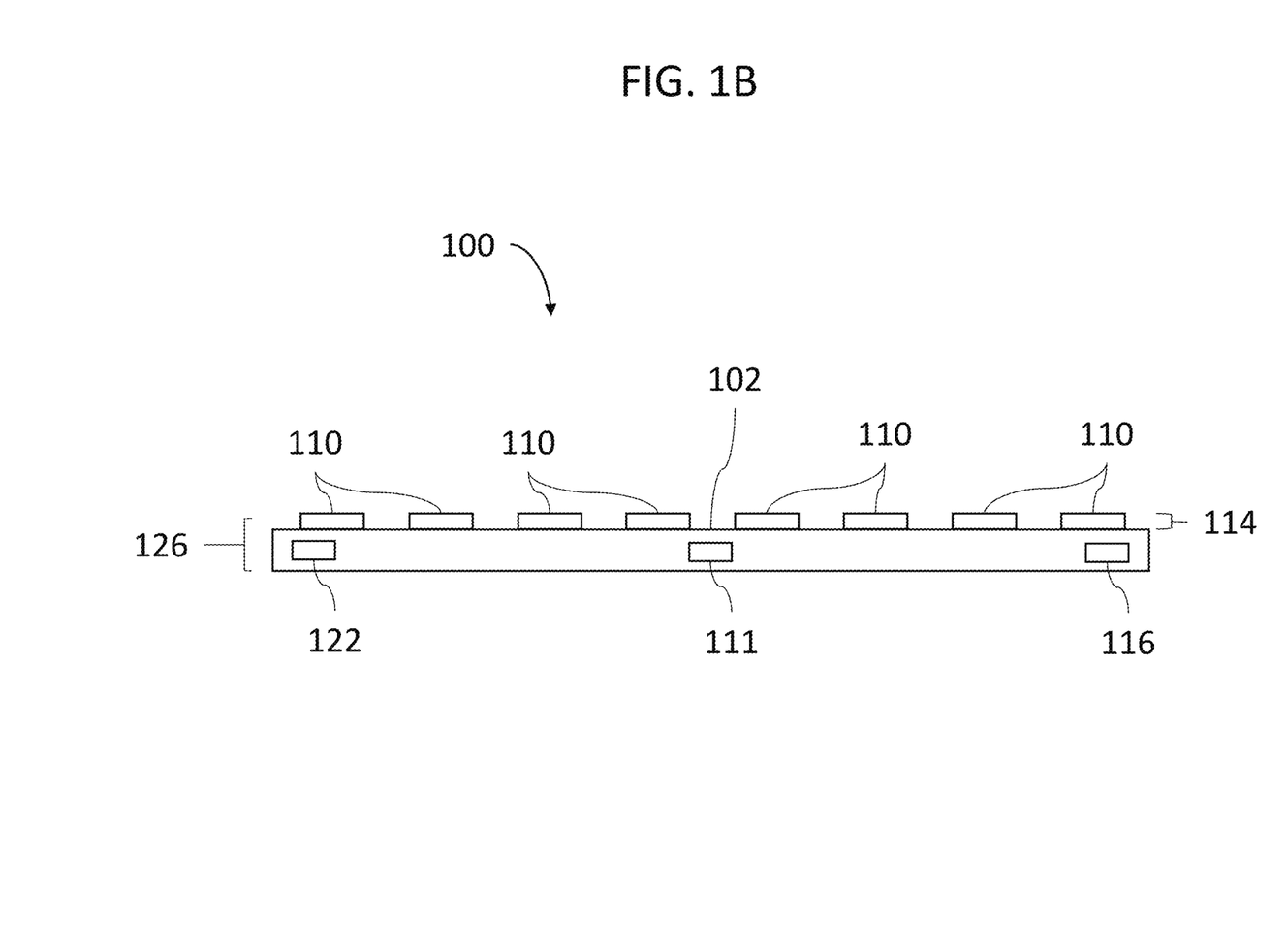
FIG. 1B depicts a wearable band in communication with a phone in accordance with embodiments of the present disclosure.

The wearable band 100 includes a plurality of haptic motors 110 (haptic vibration motors). As shown, the wearable band 100 includes eight haptic motors 110. In some exemplary embodiments, the haptic motors 110 have a width and/or diameter 112 (in the direction from the first end 104 to the second end 106) ranging from 8 mm to 12 mm. In some exemplary embodiments, the haptic motors 110 have a thickness 114 ranging from 2 mm to 4 mm as shown in FIG. 1B. The haptic motors 110 can have a width-to-thickness aspect ratio ranging from 2:1 to 6:1.

The wearable band 100 includes an antenna 116. Antenna 116 is in communication with a user device 118. User device 118 may be, for example, a mobile phone, tablet, computer, or other electronic device capable of communication. In some embodiments, the antenna 116 and user device 118 are in communication via wireless communication, such as via Bluetooth signal 120. While the communication between the wearable bands and the user devices disclosed herein is primarily described as being wireless, in some embodiments the communication between the wearable bands and the user devices is wired communication. In some embodiments, the wearable bands disclosed herein are capable of both wired and wireless communication with user devices.

The wearable band 100 includes a processor 122. The processor 122 is in data communication with the antenna 116. The processor 122 is also in data communication with each of the plurality of haptic motors 110. In operation, the user device 118 transmits the Bluetooth signal 120 to the antenna 116, the antenna then transmits the Bluetooth signal 120 or a signal corresponding with the Bluetooth signal 120 to the processor 122. The processor 122 processes the signal from the antenna 116 to convert the signal from an audio signal (e.g., a music file signal configured to direct a speaker to play music) into a haptic signal. The haptic signal is a signal configured to instruct the haptic motors 110 to vibrate in a pattern. The processor 122 transmits the haptic signal to the haptic motors 110, causing the haptic motors 110 to vibrate in the pattern in accordance with the haptic signal.

In some embodiments, adjacent haptic motors 110 are spaced apart from one another by a distance 130, as shown in FIG. 1A. Distance 130 is sufficient to satisfy the two-point resolution rule, i.e., a distance that is sufficient such that the user's brain is capable of distinguishing the inputs from each of the distinct haptic motors 110.

The wearable band 100 includes a charging port 132 for recharging the batteries (not shown) thereof. The wearable band 100 can include rechargeable batteries and can be charged in a manner that is the same as or similar to the charging of a mobile phone. In some embodiments, the wearable band 100 can operate for sixteen hours before requiring a battery recharge.

In some embodiments, the wearable band 100 includes a sensory feature 109. Sensory feature 109 may be or a light feature, such as a display screen (e.g., approximately 44 millimeters×38 millimeters) or other component capable of emitting light. Sensory feature 109 may provide for a visual display that representative of the music, including variations in the color emitted and/or the speed of flashes of the light emitted to match the frequency, beat, and mood of the music. For example, lower frequency music tones can be displayed as warm red colors, and higher frequency music tones can be displayed as cooler blue colors. The sensory feature 109 may be in communication with the processor 122 and/or antenna 116. The processor 122 may translate the Bluetooth signal 120 to a signal for emitting lights or other sensory signal (e.g., temperature) from the sensory feature 109 in a manner similar to the translation of the Bluetooth signal 120 to a signal for vibrating the haptic motors 110 in a pattern. In some embodiments, the sensory feature 109 is capable of variations in temperature in response to the Bluetooth signal 120, such that the strap 102 can be warmed or cooled in response to the Bluetooth signal 120.

Strap

Figure 1C:
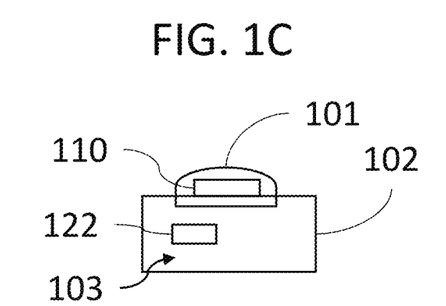
FIG. 1C is a portion of a wearable band in accordance with embodiments of the present disclosure.

With reference to FIG. 1C, in some embodiments the strap 102 includes portions made of an electrically conductive material 101, portions made of an electrically insulative material 103, or combinations thereof. For example, portions of the strap 102 that house the antenna and processor 122 can be made of an electrically insulative material 103, and portions of the strap 102 that house the haptic motors 110 can be made of an electrically conductive material 101. The haptic motors 110 can be covered (e.g., encased) and/or surrounded by the electrically conductive material 101. Encasing the haptic motors 110 in the material reduces the risk of corrosion of the haptic motors 110 and the risk of damage or irritation to a user's skin. The electrically conductive material 101 surrounding the haptic motors 110 can be attached to the electrically insulative material 103 of the strap 102. The electrically conductive material 101 can be configured such that the material does not interfere or substantially interfere with the Bluetooth signal 120, data transmission, or vibrational output of the haptic motors 110.

Figure 1D:
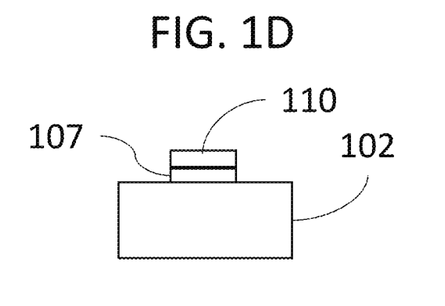
FIG. 1D is a portion of a wearable band in accordance with embodiments of the present disclosure.

With reference to FIG. 1D, in some embodiments an adhesive 107 is positioned between the strap 102 and the haptic motors 110 to adhere the haptic motors 110 to the strap 102.

Figure 1E:
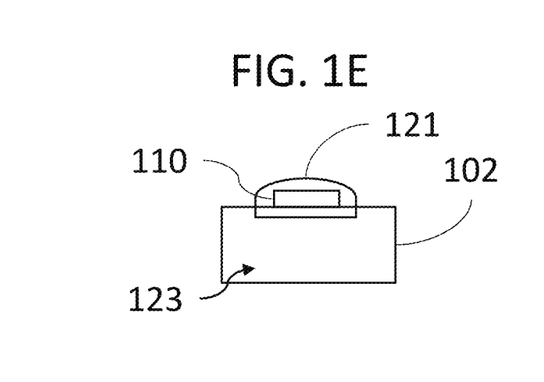
FIG. 1E is a portion of a wearable band in accordance with embodiments of the present disclosure.

With reference to FIG. 1E, in some embodiments the strap 102 includes portions made of an acoustically conductive and/or vibration conductive material 121, portions made of an acoustically insulative and/or vibration insulative material 123, or combinations thereof. For example, portions of the strap 102 that house the haptic motors 110 can be made of an acoustically conductive and/or vibration conductive material 121. The acoustically conductive and/or vibration conductive material 121 facilitates transmission of the vibrations of the haptic motors 110 to the user's skin. Remaining portions of the strap 102 may also be made of the acoustically conductive and/or vibration conductive material 121 such that the entire strap 102 is capable of vibrating, and such that the vibrations of one haptic motor are transmitted along the strap (dampening over distance) for vibratory sensation over the entire length of the strap 102. Alternatively, as shown in FIG. 1E, portions of the strap 102 that do not house the haptic motors 110 are made of an acoustically insulative and/or vibration insulative material 123 such that the vibrations from each haptic motor 110 is isolated from others and from the remainder of the strap 102. Such isolation can enhance the resolution of vibrations felt by the user. The haptic motors 110 can be covered (e.g., encased) and/or surrounded by the acoustically conductive and/or vibration conductive material 121. Encasing the haptic motors 110 in the material reduces the risk of corrosion of the haptic motors 110 and the risk of damage or irritation to a user's skin, and increases the transmission of vibrations to the user's skin. The acoustically conductive and/or vibration conductive material 121 surrounding the haptic motors 110 can be attached to the acoustically insulative and/or vibration insulative material 123, if any, of the strap 102.

Figure 1F:
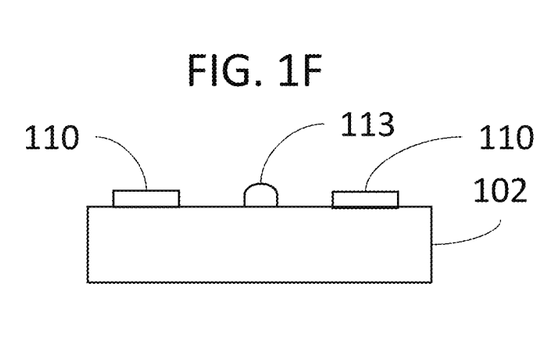
FIG. 1F is a portion of a wearable band in accordance with embodiments of the present disclosure.

With reference to FIG. 1F, in some embodiments the strap 102 includes one or more tactile features 113 positioned between adjacent haptic motors 110. The tactile features 113 can be passive (i.e., not actable haptic motors) portions of material (e.g., the same material as the strap 102) that are raised above a plane of the strap (e.g., as bumps or nodules). The tactile features 113 can respond to vibrations in the strap 102 such that when vibrations from the haptic motors 110 travel through the strap 102, the tactile feature 113 vibrates with the strap 102 and engages with the user's skin to further enhance the vibratory sensations felt by the user.

Orientation

Consistent orientation and placement of the wearable bands on the wrists and ankles provides for maximum functionality due to the high-density of mechanoreceptors on the wrist. Mechanoreceptors are denser in and around the wrist bone. Therefore, indicators for centering the wristband with the wrist bone can enhance the functionality of the bands. Additionally, positioning the haptic motors on the straps such that the haptic motors are positioned at and around the wrist bone further enhances the ability of the user's mechanoreceptors to receive the vibration signals from the bands. Also, consistent placement of the bands on the user will ensure more consistent experiences from one use to the next, i.e., a song will "feel" the same with each use if the haptic motors are positioned in the same or substantially the same place relative to the user's skin and mechanoreceptors with each use.

As shown in FIG. 1B, in some embodiments, the strap 102 includes one or more indicators 111 or other features configured to orient the strap 102 on a user's wrist or ankle when the strap 102 is worn. Indicator 111 can be positioned on the strap 102 to be centered with a user's wrist bone when worn. The indicator 111 can be positioned such that, when worn, the haptic motors 110 are positioned adjacent the wrist bone of the user to engage with the rich innervation of the dorsal intercarpal, the dorsal radiocarpal, and the scapholunate interosseous of the user, and such that the processor 122 and antenna 116 are positioned near or on the long radiolunate ligament of the user.

Size and Accessibility

In some embodiments, the wearables disclosed herein include one or more wristbands and one or more ankle bands that each have eight haptic motors (i.e., 32 total haptic motors). By incorporation the haptic motors in two wristbands and two ankle bands, the wearable disclosed herein is able to maintain a desirable size. In some embodiments, the each wrist and ankle band is independent (i.e., not physically linked or coupled) from the other, reducing bulk of the wearable. Additionally, the wearable disclosed herein does not require the use of a vest, a shirt, or other bulky torso worn wearable. The use of 32-haptic motor technology, with eight haptic motors positioned on each wrist and ankle of a user, provides the wearables disclosed herein with accessibility and ease of use.

Some exemplary wearable band sizes are shown in Table 3, below.

TABLE 3

Exemplary Wearable Band Sizes

| Band | Base Length | Optional Insert |
|---|---|---|
| Standard Wristband | 177.8 millimeters | 6.35 millimeters |
| Small Wristband | 152.4 millimeters | 6.35 millimeters |
| Extended Wristband | 203.2 millimeters | 6.35 millimeters |
| Standard Ankleband | 241.3 millimeters | 6.35 millimeters |
| Small Ankleband | 215.9 millimeters | 6.35 millimeters |
| Extended Ankleband | 266.7 millimeters | 6.35 millimeters |

The optional inserts can be added to an existing band (e.g., at the band clasp) to create extra circumference for sizing purposes. The inserts can, for example, slide into and lock in place using a butterfly clasp. In some embodiments, the strap does not overlap itself at any location, avoiding interference with the sensation of the haptic motors.

In one exemplary embodiment of the wearable band 100 in the form of a wristband, the wearable band 100 has a length 124, from the first end 104 to the second end 106, of about 177.8 mm and a thickness 126 of about 5.3 mm. In one exemplary embodiment of the wearable band 100 in the form of an anklet, the wearable band 100 has a length 124 of about 279.4 mm and a thickness of about 5.3 mm.

Wearable Band Set

Figure 2:
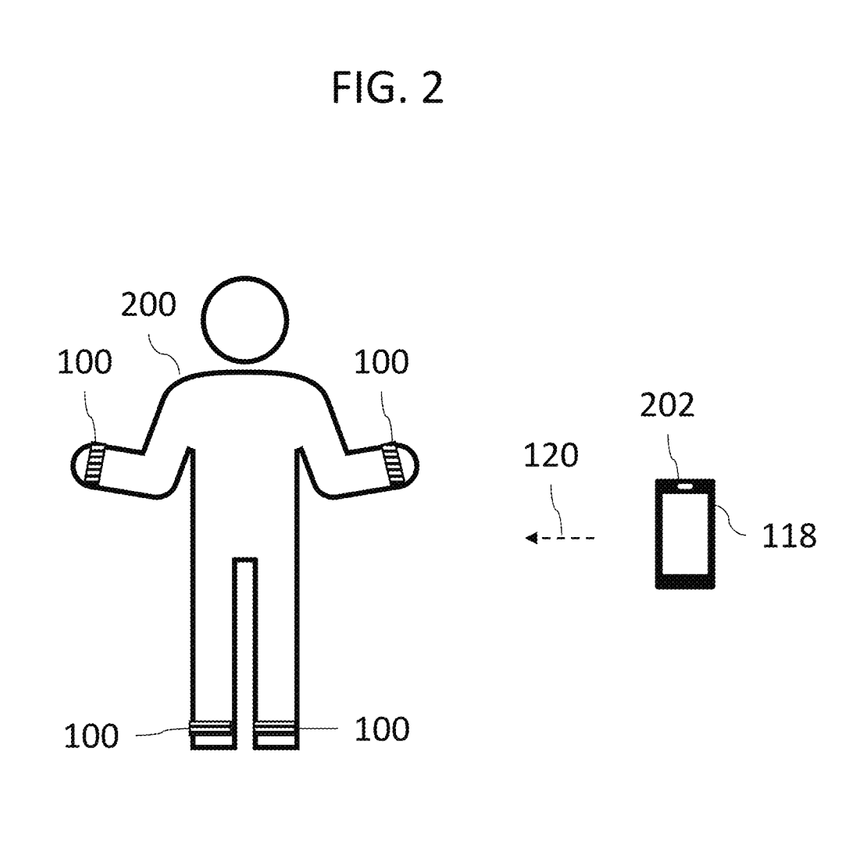
FIG. 2 depicts a user wearing four wearable bands in accordance with embodiments of the present disclosure.

While a single wearable band is shown in FIGS. 1A and 1B, in some embodiments each wearable band disclosed herein are configured to be used in conjunction and in unison with additional wearable bands. With reference to FIG. 2, in one embodiment four wearable bands 100 are worn by a user 200. User 200 is wearing a wearable band 100 on each wrist and on each ankle. Each wearable 100 can be the same as or similar to those shown in FIGS. 1A-1F. The user device 118 generates the Bluetooth signal 120 in response to music being played on the user device 118 or in response to sounds received by a microphone 202 on the user device 118. Upon receipt of the Bluetooth signal 120, the haptic motors (not shown) of each of the wearable bands 100 are activated and result in a pattern of vibrations being generated that are then sensed by the skin of the user 200.

In some embodiments, all haptic motors 110 within a single wearable band 100 vibrate in the same pattern. In some embodiments, one or more of the haptic motors 110 in a single wearable band 100 vibrate in a different pattern than other haptic motors 110 on that wearable band 100. In some embodiments, all haptic motors 110 on all wearable bands 100 vibrate in the same pattern. In some embodiments, the haptic motors 110 on one or more of the wearable bands 100 vibrate in a different pattern or patterns than the haptic motors 110 on other wearable bands 100 of the plurality of wearable bands 100. In one particular embodiment, the haptic motors 110 on the wearable bands 100 positioned on the user's wrists vibrate in a different pattern than the haptic motors 110 positioned on the user's ankles. For example, the haptic motors 110 on the user's ankles can be configured to vibrate in a manner than corresponds with base notes on the music and the haptic motors 110 on the user's wrists can be configured to vibrate in a manner than corresponds with treble notes on the music. The haptic motors 110 worn on the right side wrist and ankle of the user's body can be configured to vibrate in a manner that corresponds with right speaker output signals of the music, and the haptic motors 110 worn on the left side wrist and ankle of the user's body can be configured to vibrate in a manner that corresponds with left speaker output signals of the music. Thus, with four wearables 100, the user 200 is provided with a pattern or patterns of vibrations at multiple different locations on the user's body in a manner that results in a "surround body experience" of vibrations that is analogous to a surround sound experience of the hearing enabled. The use of four wearable bands, each with eight haptic motors (i.e., thirty-two total haptic motors), provides for high resolution haptic output with two-point resolution. With four wearable bands at four different locations on the body, a framework of vibrations is created that stimulates mechanoreceptors and somatosensory systems in various parts of the body, allowing the sound experience to be heightened.

In some embodiments, the functionality of each of the wearable bands 100 is identical. In other embodiments, the functionality of at least one of the wearable bands 100 is different than the functionality of at least one other of the wearable bands 100. For example, in some embodiments each of the four wearable bands 100 include haptic motors 110 for providing vibrations, and only one of the wearable band 100, such as the wearable band 100 configured to be worn on the left or right wrist, includes the sensory feature 109 as shown in FIG. 1A. The conjunction of the sensory feature 109 and the haptic motors 110 can provide for a synergistic music experience. Embodiments of the sensory feature 109, including those that emit light as "audio-visualizers," enhance the musical sensory experience through the added component (e.g., visual component). For example, the speed of the music tones can be reflected through the flashing/display of lights (e.g., variations in intensity, using rapid light repetitions to show fast-paced music, using light increases and fades gradually to reflect softer, slower-paced music).

In some embodiments, the wearable bands 100 provide for a "headphone-like" experience to users. For example, the vibrations emitted by the haptics on the right wristband and the right ankleband can mimic the sound that would otherwise be emitted by the right speakers of a stereo speaker system playing the music, and the vibrations emitted by the haptics on the left wristband and the left ankleband can mimic the sound that would otherwise be emitted by the left speakers of the stereo speaker system playing the music. Also, the small size and portability of the wearable bands corresponds with the small size and portability of headphones. In some embodiments, vibrations associated with the lyrics/speech of the music can be separated from vibrations associated with the instruments of the music and sent to different bands, such that the user can differentiate the lyrics (e.g., causing the ankles to vibrate) from the music (e.g., causing the wrists to vibrate).

The use of two wristbands and two anklets, each having eight haptic motors, allows for stimulation of a plurality of mechanoreceptors on various areas of the user's body to provide the user with a surround body experience.

The wearables disclosed herein provide for a quality sound with a distinct translation from the music to the haptic motors to the brain, resulting in vibrations of different pitches. The distinct quality of the translation is provided, at least in part, by the use of two-point resolution rule in which adjacent haptic motors on the wearables disclosed herein, when worn, are positioned a distance from one another that is sufficient such that the brain is capable of distinguishing the inputs from each of the distinct haptic motors.

The rapidity of the translation of the wearables disclosed herein is provided, at least in part, by the use of Bluetooth communication between the wearables of the sound source, where data is transmitted and processed into vibrations in, for example, sixteen milliseconds. This rate provides for almost simultaneous translation from the playing of a song to the perception of the song as vibrations on the skin.

Haptics

Embodiments of the wearable bands disclosed herein use haptics and microphones, and exploit the functions of mechanoreceptors, neurons and the electrochemical signal processing of the brain to provide a music experience to those with hearing loss. Haptics are devices that engage tactile senses, such as through vibration. Haptic motors, also referred to as "exciters," engage mechanoreceptors in the skin and provide vibrations on the skin. For example, exciters can spin or otherwise move to form vibrations. Microphones operate to receive sound and convert the sound into electric currents. The electromagnetic field of the electric currents, optionally in conjunction with magnetic field created by sound waves, actuate the exciters to cause motors of the exciters to spin (or otherwise move). The mechanoreceptors on the skin are part of the somatosensory system of the human body. The exciters are positioned on the skin such that the mechanoreceptors receive the stimuli (e.g., vibrations) of the actuated exciters. The neurons of the brain receive the information from the mechanoreceptors, and the brain receives data as electrochemical signals and operates assign to meaning to those signals. The haptic motors used herein can vary in size (e.g., width, thickness, aspect ratio), shape (e.g., disc, rectangular prism), arrangement (e.g., parallel or random arrangement, position on the strap, even or varied spacing), and packing density. By varying the aspects of the haptic motors and the arrangement thereof on the strap, the vibration patterns experienced by the user can be fine-tuned. For example, a higher packing density of the haptic motors and/or larger haptic motors can be used at locations of the user that it is desirable to provide the most vibrations to. The shapes of the haptic motors, or at least the surfaces thereof, can be configured to conform to the user's wrist or ankle.

Wireless Communication

The wearables disclosed herein can be configured to use Bluetooth communication in conjunction with haptics, specifically exciters, in order to produce a music experience. The use of Bluetooth in the such wearables provides the ability of those with hearing loss to experience digital music (e.g., streaming services such as Apple Music, Spotify and Amazon Music), replicating the experience of using headphones, rather than being limited to live concert-based applications. Bluetooth operates to transmit data through radio waves, and is a short-range technology, with a range of around 100 meters. In operation, data is transmitted via Bluetooth from a source device, such as a mobile phone playing music, to a haptic motor of the wearable. The data transmitted by Bluetooth actuates the haptic motors, causing the motors to spin (or otherwise move) in response electromagnetic radiation of the Bluetooth signal. That is, the oscillating electric and magnetic fields of the Bluetooth signal causes the haptic motors to generate vibrations. Embodiments of the wearables disclosed herein use Bluetooth signals with a frequency band of about 2.4 GHz. The use of 2.4 GHz provides for more data to be transferred to the motors in comparison to using a frequency of 900 MHz, and provides an effective product. In some embodiments, the use of 2.4 GHz provides for transfer of up to 100 megabits per second (Mbps) od data at a range of up to 100 meters.

After data travels via Bluetooth to the exciters, the vibrations created from the haptic motors are transferred to the neurons of the brain through mechanoreceptors. The vibrations are received as electromagnetic signals when they reach the neurons. When the neurons stimulate, electric potential is created. The brain then begins to recognize patterns amongst the vibrations and assigns meaning to the patterns. The assigned meanings are perceived in the manner that sound is perceived in a hearing-abled person, providing for sensory substitution and an enhanced musical experience. During use of the wearables, a user's brain can quickly adapt to the sensory substitution process that the wearable induces. In some applications, lip reading and vocalization can be used to facilitate adapting to the sensory substitution process that the wearable induces. In some embodiments, the wearables include sound-to-light features in combination with haptic features.

Conversion of Sound into Vibrations

Figure 3:
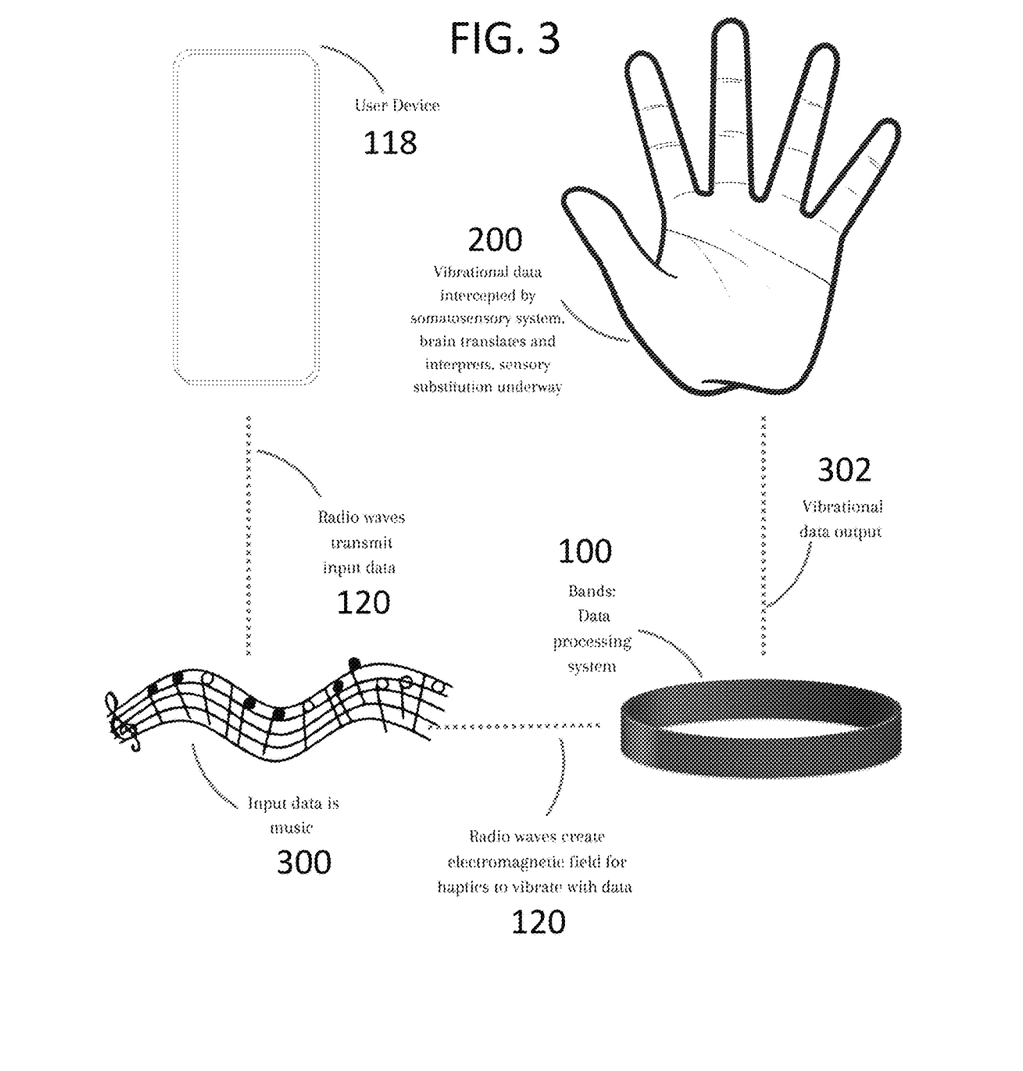
FIG. 3 is a schematic showing the stages of communication that convert a signal from a phone into vibrations felt by a user in accordance with embodiments of the present disclosure.

FIG. 3 is a simplified schematic showing the conversion of music into vibrations to be felt by a user. User device 118 transmits Bluetooth signal 120 that correspond with music 300. The Bluetooth signal 120 can be the same signal that the user device 118 would typically transmit to a Bluetooth enabled speaker to instruct the speaker to play the music associated with the Bluetooth signal 120. The Bluetooth signal 120 is received by the data processing system of the wearable band 100, i.e., the antenna (not shown) and the processor (not shown). The processor translates the Bluetooth signal 120 into a haptic motor signal that is communicated to the haptic motors (not show) of the wearable band 100. The processor can be configured, such as with computer instructions, to convert the Bluetooth signal 120 into a haptic motor signal. While not shown, the wearable band 100 can include a non-transitory data storage for storage of computer instructions that instruct the processor. While a translation step is described herein, in some embodiments, the Bluetooth signal 120 is not translated prior to being directed to the haptic motors for actuation thereof. In some embodiments, the processor is a CPU or GPU.

The Bluetooth signal 120 is electromagnetic in nature, which actuates the haptic motors to spin and vibrate. Upon receipt of the haptic motor signal, the haptic motors vibrate in a pattern in accordance with the haptic motor signal. The pattern of vibration of the haptic motors corresponds with the beat, melody, and other aspect of the music 300. The vibrations 302 are transmitted to the user 200. The vibrations 302 are interpreted by the somatosensory system of the user 200, and the user's brain translates and interprets the signals from the somatosensory system (e.g., in accordance with sensory substitution). In some embodiments, the wearable bands disclosed herein, including two wristbands and two anklets, can be configured to simulate a headphone-like experience through the utilization of vibrations from the haptic motors to initiate somatosensorial feedback, enacting sensory substitution. In some embodiments, the time span from the moment the music is played on the user device until the moment the brain interprets the electrochemical signals takes approximately sixteen milliseconds.

Wearable Band and User Device Components

Figure 4A:
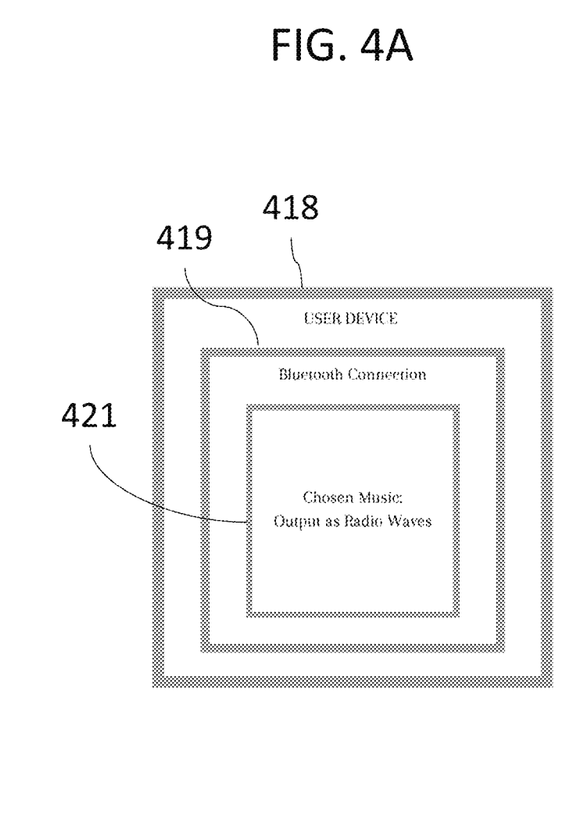
FIG. 4A is a schematic showing components of a user device in accordance with embodiments of the present disclosure.
Figure 4B:
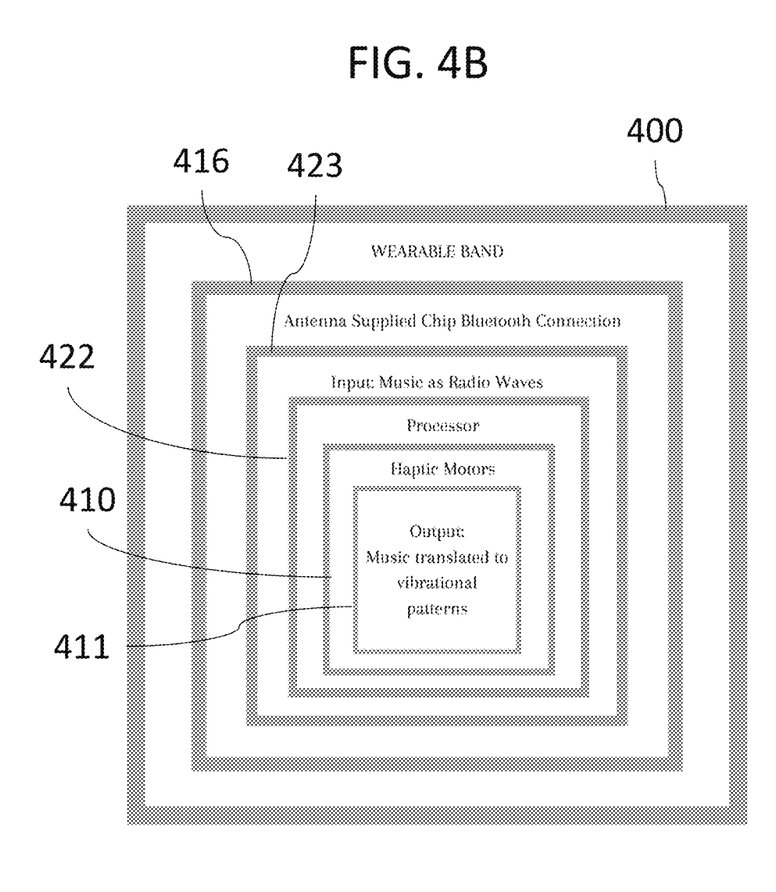
FIG. 4B is a schematic showing components of a wearable in accordance with embodiments of the present disclosure.

FIGS. 4A and 4B are schematics shown components of the user device and the wearable band. User device 418 includes Bluetooth communication hardware and software 419 and a music file 421. Wearable band 400 includes an antenna 416 configured for receipt of Bluetooth signals and a processor 422 to which the antenna 416 transmits the Bluetooth signal, transmission of signal 423. The wearable band 400 includes haptic motors 410 that receive signals from the processor 422 to actuate vibrations of the haptic motors 410 such that a translation of the music is output from the haptic motors 410 as vibrational patterns 411. Thus, in operation, the user device 418 produces a Bluetooth signal that corresponds with the music file 421. The Bluetooth communication hardware and software 419 transmits the Bluetooth signal to the antenna 416 of the wearable band 400. The antenna 416 transmits the signal 423 to the processor 422. The processor 422 translates the signal 423 into a haptic motor signal and actuates the haptic motors 410, which outputs a translation of the music file 421 in the form of vibrational patterns 411.

While the Bluetooth signal can correspond with a music file that is saved on the user device or another device (e.g., cloud storage) in communication with the user device, in other embodiments the Bluetooth signal is generated by the user device in response to sound that the user device receives. For example, if the user is at a concert, the user device can receive the music being played via a microphone on the user device and can form a Bluetooth signal to correspond to the music received. Thus, the user can enjoy live music events in real-time.

Process

Figure 5:
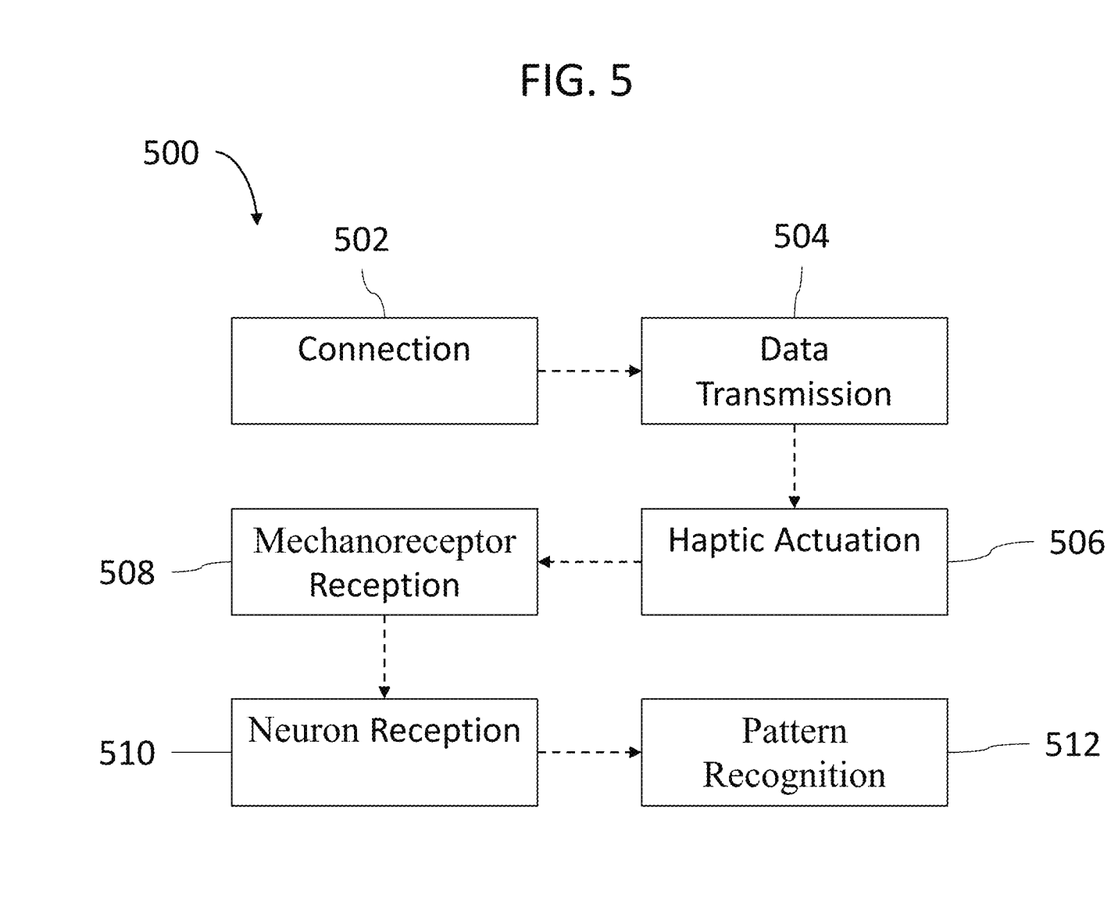
FIG. 5 is a flow-chart of a process for converting sound into a haptic experience.

FIG. 5 is a flow-chart of a process in accordance with embodiments of the present disclosure. The process 500 includes a connection step 502 that includes connecting a phone with haptic motors of the wearable. For example, the connection step 502 can include establishing a Bluetooth communication link between a phone and haptic motors. The wearable disclosed herein can include communication hardware and/or software configured to allow the wearable to receive and/or transmit data, such as via Bluetooth. The communication between the phone and the haptic motors may be established through use of a software application (App) downloaded onto the phone.

The process 500 includes a data transmission step 504 that includes transmission of data that is associated with music from the phone, via a Bluetooth signal, to the haptic motors. For example, a song can be played on a music App on the phone, and the phone can be configured to transmit a Bluetooth signal associated with that music to the haptic motors.

The process 500 includes a haptic actuation step 506. In the haptic actuation step 506, the haptic motors of the wearable receive the Bluetooth signal of the transmission step 104, which causes the exciters of the haptic motors to spin or otherwise move.

The process 500 includes a mechanoreceptors reception step 508 in which the exciters engage with mechanoreceptors on the user's skin such that the mechanoreceptors sense the vibrations of the exciters. For example, upon actuation of the haptic motors, the movement of the exciters causes vibrations on the wearer's skin, which the mechanoreceptors sense in the reception step 508.

The process 500 includes a neuron reception step 510 in which the wearer's neurons receive signals from the mechanoreceptors that correspond with the sensed vibrations. The neurons become electro-potentially charged upon receipt of the signals.

The process 500 includes a pattern recognition step 512 in which the wearer's brain recognizes and assigns meaning to the electrochemical patterns of the charged neurons.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A haptic wearable system, the system comprising:
a first wearable band comprising a first strap and a first plurality of haptic motors coupled with the first strap;
a second wearable band comprising a second strap and a second plurality of haptic motors coupled with the second strap;
wherein the first and second wearable bands are configured to be worn on a left wrist and a right wrist of a user;
indicators positioned to orient the first wearable band and the second wearable band on a user's wrist, wherein the indicators are positioned such that, when worn, the haptic motors are positioned and arranged on the first strap and the second strap to engage with a user's wrists adjacent wrist bones to engage with a rich innervation of a dorsal intercarpal, a dorsal radiocarpal, and a scapholunate interosseous of a user to activate mechanoreceptors of a user; and
wherein each of the haptic motors is configured to vibrate in response to a Bluetooth signal and in a pattern representative of music associated with the Bluetooth signal, and wherein the haptic motors are configured to vibrate in a pattern that stimulates a somatosensory system of a user.

2. The haptic wearable system of claim 1, wherein each strap comprises a conductive material, and wherein the haptic motors are encased within the conductive material, wherein the conductive material is electrically conductive, acoustically conductive, or combinations thereof.

3. The haptic wearable system of claim 1, comprising an antenna configured for receipt of a Bluetooth signal, and a processor in communication with the antenna and the haptic motors and configured to translate Bluetooth signals into haptic motor signals.

4. The haptic wearable system of claim 1, wherein each strap comprises an insulative material, wherein the insulative material is electrically insulative, acoustically insulative, or combinations thereof.

5. The haptic wearable system of claim 1, wherein each haptic motor is acoustically isolated from other haptic motors.

6. The haptic wearable system of claim 1, comprising one or more tactile features on each strap, the tactile features positioned between adjacent haptic motors on each strap.

7. The haptic wearable system of claim 1, wherein the haptic motors are positioned to engaged with a user's skin and induce sensory substitution in the user when worn.

8. The haptic wearable system of claim 1, each haptic motor has a width or diameter ranging from 8 mm to 12 mm and a thickness ranging from 2 mm to 4 mm.

9. The haptic wearable system of claim 1, wherein adjacent haptic motors on each wearable band are spaced apart by a distance that is sufficient to provide for two-point resolution.

10. The haptic wearable system of claim 1, wherein the first wearable band comprises a light or display screen in communication with the processor and configured to emit light in a pattern representative of music associated with the Bluetooth signal;
wherein the sensory feature is configured to emit light that varies in color and flashing rate light to represent a frequency, beat, and mood of the music associated with the Bluetooth signal.

11. The haptic wearable system of claim 1, comprising inserts configured to couple with the first strap and the second strap to expand a size of the first strap and the second strap.

12. The haptic wearable system of claim 1, wherein the Bluetooth signal is has a frequency of about 2.4 GHz.

13. The system of claim 1, comprising:
a third wearable band comprising a third strap and a third plurality of haptic motors coupled with the third strap;
a fourth wearable band comprising a fourth strap and a fourth plurality of haptic motors coupled with the fourth strap; and
wherein the third and fourth wearable bands are configured to be worn on a left ankle and a right ankle of a user.

14. The haptic wearable system of claim 13, wherein the first and second wearable bands are configured to be worn on wrists of a user vibrate in a different pattern than the third and fourth wearable bands configured to be worn on ankles of a user.

15. The haptic wearable system of claim 13, wherein the wearable bands configured to be worn on the right wrist and right ankle of a user are configured to vibrate in a different pattern than the wearable bands configured to be worn on the left wrist and left ankle of a user.

16. The haptic wearable system of claim 15, wherein the wearable bands configured to be worn on the right wrist and right ankle of a user vibrate in a pattern representative of a right speaker output of the Bluetooth signal, and the wearable bands configured to be worn on the left wrist and left ankle of a user vibrate in a pattern representative of a left speaker output of the Bluetooth signal.

17. A method experience music for the hearing loss community, the method comprising:
wearing a first wearable band of a haptic wearable system on a left wrist, the first wearable band comprising a first strap and a first plurality of haptic motors coupled with the first strap;
wearing a second wearable band of the haptic wearable system on a right wrist, the second wearable band comprising a second strap and a second plurality of haptic motors coupled with the second strap;
wherein indicators are positioned to orient the first and second wearable bands on the wrists, wherein the indicators are positioned such that, when worn, the haptic motors are positioned and arranged on the first and second straps to engage with the wrists adjacent wrist bones to engage with a rich innervation of a dorsal intercarpal, a dorsal radiocarpal, and a scapholunate interosseous to activate mechanoreceptors;
connecting each wearable band with a user device via a Bluetooth connection;
transmitting a music file from the user device to each wearable band via the Bluetooth connection;
wherein, upon receipt of the music file, the haptic motors vibrate in a pattern that is representative of music associated with the music file, and wherein the haptic motors are configured to vibrate in a pattern that stimulates a somatosensory system of a user.

18. A method of translating a music file into a tactile experience for users, the method comprising:
providing for the transmission of a music file from a user device to a haptic wearable system via a Bluetooth signal;
providing for the translation of the music file into a haptic signal; and
providing for the transmission of the haptic signal to the haptic motors of the wearable bands;
wearing the haptic wearable system comprises a first wearable band configured to be worn on a left wrist, the first wearable band comprising a first strap and a first plurality of haptic motors coupled with the first strap, and a second wearable band configured to be worn on a right wrist, the second wearable band comprising a second strap and a second plurality of haptic motors coupled with the second strap;
wherein indicators are positioned to orient the first and second wearable bands on the wrists, wherein the indicators are positioned such that, when worn, the haptic motors are positioned and arranged on the first and second straps to engage with the wrists adjacent wrist bones to engage with a rich innervation of a dorsal intercarpal, a dorsal radiocarpal, and a scapholunate interosseous to activate mechanoreceptors;
wherein the haptic motors are configured to vibrate in a pattern that stimulates a somatosensory system of a user.

* * * * *